United States Patent
Huang

(10) Patent No.: US 10,691,204 B2
(45) Date of Patent: *Jun. 23, 2020

(54) FINGER MOUNTED COMPUTER INPUT DEVICE AND METHOD FOR MAKING THE SAME

(71) Applicant: Xiong Huang, Bellevue, WA (US)

(72) Inventor: Xiong Huang, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/981,006

(22) Filed: May 16, 2018

(65) Prior Publication Data
US 2018/0267606 A1 Sep. 20, 2018

Related U.S. Application Data

(63) Continuation of application No. 15/186,468, filed on Jun. 18, 2016, now Pat. No. 10,001,836.

(60) Provisional application No. 62/182,239, filed on Jun. 19, 2015.

(51) Int. Cl.
*G06F 3/01* (2006.01)
*G06F 3/033* (2013.01)
*G06F 3/0338* (2013.01)

(52) U.S. Cl.
CPC .............. *G06F 3/014* (2013.01); *G06F 3/017* (2013.01); *G06F 3/033* (2013.01); *G06F 3/0338* (2013.01); *G06F 2203/0331* (2013.01)

(58) Field of Classification Search
CPC .......... G06F 3/014; G06F 3/017; G06F 3/033; G06F 3/0338; G06F 3/03545; G06F 3/03546; G06F 3/0304; G06F 2203/0331
See application file for complete search history.

(56) References Cited

U.S. PATENT DOCUMENTS

| | | | | |
|---|---|---|---|---|
| 6,850,224 B2* | 2/2005 | Baughman | ......... | G06F 3/03543 345/156 |
| 7,042,438 B2* | 5/2006 | McRae | ................... | A63F 13/06 345/156 |
| 8,471,815 B2* | 6/2013 | Jaouen | ..................... | G05G 5/05 345/156 |
| 8,681,101 B1* | 3/2014 | Haney | ..................... | G06F 3/033 345/161 |
| 10,001,836 B2* | 6/2018 | Huang | .................. | G06F 3/0338 |
| 2002/0101402 A1* | 8/2002 | Yu | ........................... | G06F 3/011 345/156 |
| 2002/0163495 A1* | 11/2002 | Doynov | ................. | G06F 3/014 345/156 |
| 2005/0052412 A1* | 3/2005 | McRae | ................... | A63F 13/06 345/158 |
| 2007/0273643 A1* | 11/2007 | Erez | ....................... | G06F 3/0338 345/156 |
| 2007/0279380 A1* | 12/2007 | Murillo | .................. | G06F 3/014 345/161 |

(Continued)

*Primary Examiner* — Tom V Sheng
(74) *Attorney, Agent, or Firm* — Zhihua Han

(57) ABSTRACT

A finger mounted computer input device is provided. The device includes a housing adapted to be worn on a finger, a pressure response unit configured to convert pressure into movement, and a movement sensing unit comprising a motion sensor capable of measuring the movement of the pressure response unit in response to the pressure. The device allows a user to control a cursor on a computer screen and input command without the restrictive requirement of a rigid flat space, and is particularly suited the anatomy of fingers, thus ergonomic to a user's hand.

14 Claims, 4 Drawing Sheets

(56) References Cited

U.S. PATENT DOCUMENTS

| | | | |
|---|---|---|---|
| 2011/0267318 A1* | 11/2011 | Knee | G06F 3/016 345/179 |
| 2012/0075196 A1* | 3/2012 | Ashbrook | G06F 3/014 345/173 |
| 2014/0168172 A1* | 6/2014 | Zeliff | G06F 3/03545 345/179 |

* cited by examiner

FINGER MOUNTED COMPUTER INPUT DEVICE AND METHOD FOR MAKING THE SAME

CROSS-REFERENCE TO RELATED APPLICATION

This application is a Continuation Application of U.S. patent application Ser. No. 15/186,468, filed on Jun. 18, 2016, which claims priority to U.S. Provisional Patent Application No. 62/182,239, filed on Jun. 19, 2015, entitled "FINGER MOUNTED COMPUTER INPUT DEVICE AND METHOD FOR MAKING THE SAME," which is hereby incorporated by reference in its entirety.

FIELD

This application relates in general to computer input device and, in particular, to finger mounted computer input device.

BACKGROUND

There are several types of computer input devices, including conventional computer mouse and joystick. A conventional computer mouse requires a flat surface for support and to move around. The conventional computer mouse is usually placed on the flat surface. When the mouse is moved over the flat surface, the relative movement is detected and transmitted to the computer. Such a mouse is also often equipped with click buttons and a scroll wheel. A problem with this type of input device is a flat surface limits the range of use. Another problem is to some users, especially long-time users, mouse is ergonomically problematic and can cause undue stress on a user's hand.

Another type of computer input devices are joysticks. Instead of detecting the relative movement between the computer device and the flat surface as with a conventional computer mouse, with a joystick the inclination of a handle is detected and transmitted to the computer. Joysticks requires a steady base to rest upon. This requirement again limits the range of use.

The increased popularity of computing devices calls for a computer input device that has the functionalities of a traditional mouse, without the incumbent inconvenience and restriction associated a flat surface or a steady base.

Thus there remains a need ergonomic computer input device that can be operated with minimum stress on fingers and does not require a flat surface or a steady base.

SUMMARY

Signal input into a computer can be provided through finger mounted computer input device that includes two components, a pressure tracking module localized with a housing to detect and measure a pressure experienced by the device, and an attachment unit that attaches the housing to a finger. The device does not require a flat space in order to function, as a traditional mouse would, and is ergonomically superior to a traditional mouse. In one embodiment, the pressure tracking module includes a pressure response unit configured to convert pressure into movement, and a movement sensing unit comprising a motion sensor capable of measuring the movement of the pressure response unit in response to the pressure. A signal transmitter communicates information about the detected pressure to a computer. At least one contact switch is located on the house to communicate with the computer.

A method for constructing a finger mounted computer input device is also provided. The method includes providing a housing adapted to be worn on a finger; providing a pressure tracking module significantly localized within the housing to detect and measure pressure; providing a signal transmitter for communicating information about the detected pressure to a computer; providing at least one momentary contact switch located on the house configured to communicate with the computer; and attaching an attachment unit to the housing. The pressure tracking module comprises a pressure response unit and a movement sensing unit; the former being configured to convert pressure into movement via a structure of a ball-and-socket joint, and the latter comprising a motion sensor capable of measuring the movement of the pressure response unit.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

DETAILED DESCRIPTION

Figure 1:
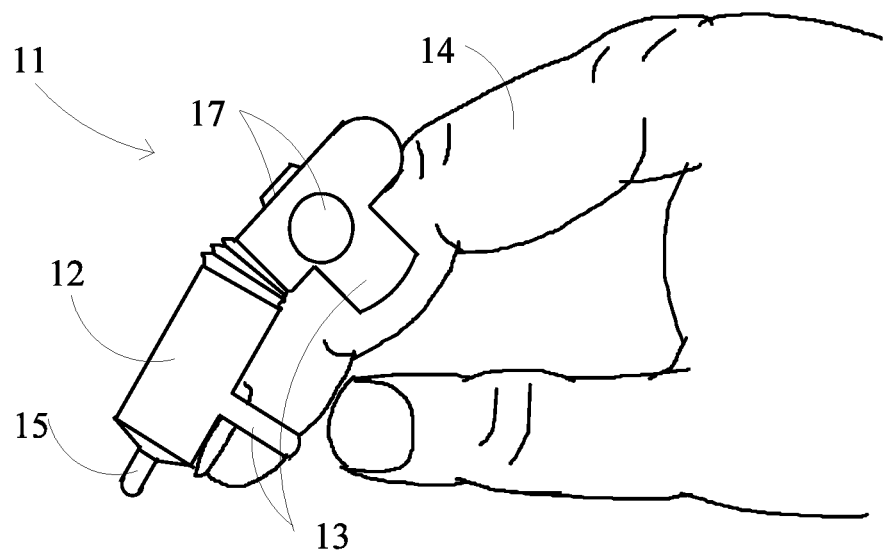
FIG. 1 is a diagram showing, by way of example, a finger mounted computer input device fitted to an index finger of a user, in accordance with one embodiment.

Signal input into a computer or other associated device can be provided through a finger mounted computer input device that includes a pointer control unit and a finger attachment unit. FIG. 1 is a diagram showing, by way of example, a finger mounted computer input device fitted to an index finger of a user, in accordance with one embodiment. The finger mounted computer input device 11 includes a pointer control unit 12 connected to a finger attachment unit 13 that fits the input device securely yet comfortably to a finger 14 of a user. The finger mounted computer input device 11 may be attached to a finger of a user, depending on the preference of the user. During use, the finger mounted computer input device 11 is oriented longitudinally from palm to fingertip so that a pointer tip 15 points away from a finger and comes into contact with a surface (not shown).

Once coming into contact with the surface, the finger 14 may easily direct, control, or change the angle between the point tip 15 and the surface, and apply a force on the input device so that a pressure on the point tip 15 is created along any angle or towards any direction. The pressure results in a movement of the point tip 15 away from its centered or rested position. The direction and speed of the movement can be captured by a motion sensor which is part of the pointer control unit 12. The motion sensor is connected to an electronic circuitry that records electronic signals corresponding to the movement and communicates the electronic signals to an associated computer. The pointer control unit 12 thus senses a finger motion and translates the motion into a cursor movement on a computer screen. Additional input can be achieved through a contact switch 17, commonly known as a button, which further communicates with the associated computer.

The placement of the finger mounted computer input device 11 at a finger not only significantly improves the comfort and ease of use, but also expands the occasion and opportunity of use by doing away with the requirement of a flat surface. In contrast to a traditional mouse, the pointer tip 15 does not need to glide on a surface; although gliding can be tolerated. As a result, the size of the surface supporting the finger mounted computer input device 11 can be rather small; for example, a size comparable to the size of the pointer tip 15. Any surface sufficient to accommodate the pointer tip 15 can suffice. Moreover, the surface does not need to be flat, since the pointer tip 15 can rest on an undulating or uneven surface and still functions. Furthermore, the finger mounted computer input device 11 can function in an elastic or yielding surface, in contrast to a traditional mouse that requires a rigid or stiff surface. In addition, stress placed on hand muscles are significantly reduced compared to using a conventional mouse, since control can be exerted by changing directions of a finger and modulating the pressure between the pointer tip 15 and the surface, in contrast to dragging a mouse around an area.

Figure 2:
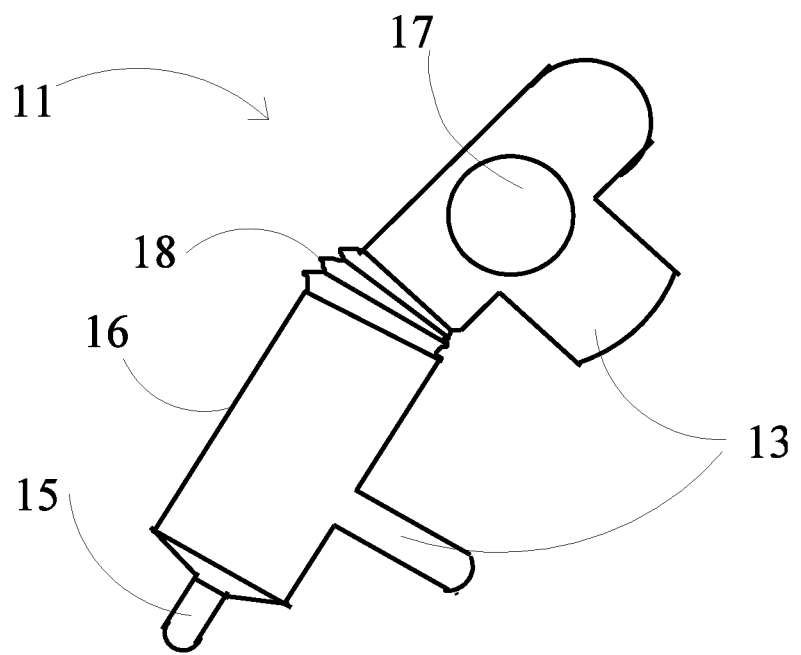
FIG. 2 is a side view of a finger mounted computer input device in accordance with one embodiment.
Figure 3:
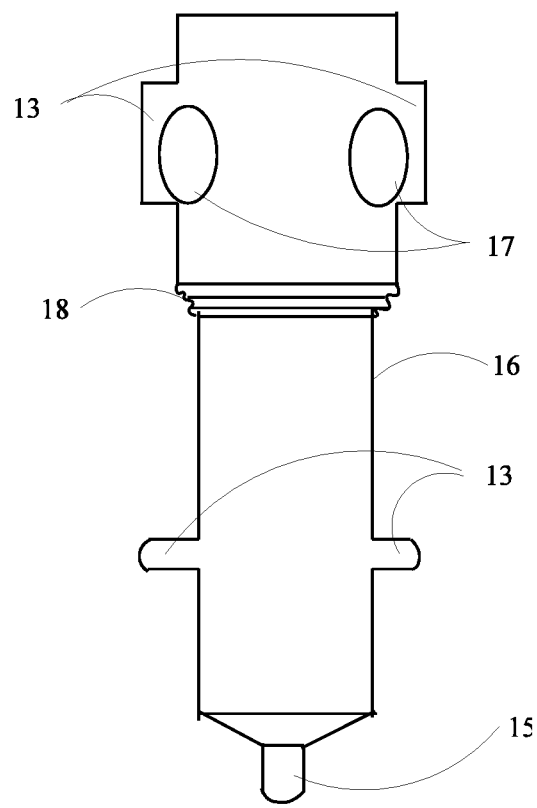
FIG. 3 is a front view of a finger mounted computer input device in accordance with one embodiment.

During use, the finger mounted computer input device 11 is first adhered to a finger 14 through an attachment unit 13. FIGS. 2 and 3 are a side view and a front view, respectively, of a finger mounted computer input device 11 in accordance with one embodiment. The pointer control unit 12 is encased in a housing 16, with an exception that the pointer tip 15 extend outside the housing 16. The housing 16 is adapted to be worn on a finger, through the attachment unit 13. The housing 16 can take on a shape of an elongated pen. The housing 16 can also take on a shape of a rectangular prism. Other shapes are possible. In one embodiment, a bendable joint 18 is introduced into the housing 16. The bendable joint 18 accommodates the curvature of the distal interphalangeal joint in a finger and promotes a more secure and comfortable fit. The size of the housing 16 generally conforms to the sizes of fingers. In one embodiment, the length of the housing 16 can be 0.5 inches to 3 inches. In another embodiment, the length of the housing 16 can be 1 inches to 2 inches.

In one embodiment, the housing 16 contains at least one contact switch 17. In another embodiment, two contact switches are located on the left and right side of the housing. In still another embodiment, a contact switch is located on the attachment unit 13. In a preferred embodiment, a contact switch 17 can be shaped like a button, and switching or triggering of the contact switch 17 can be effected through pushing, pressing, or compressing the button. A further electronic circuitry (not shown) is located within the housing 16 and is capable of converting the pushing, pressing and compressing of the contact switch 17 into signals and transmitting the signals to a connected computer. In a preferred embodiment, the contact switch 17 is a momentary contact switch.

Figure 4:
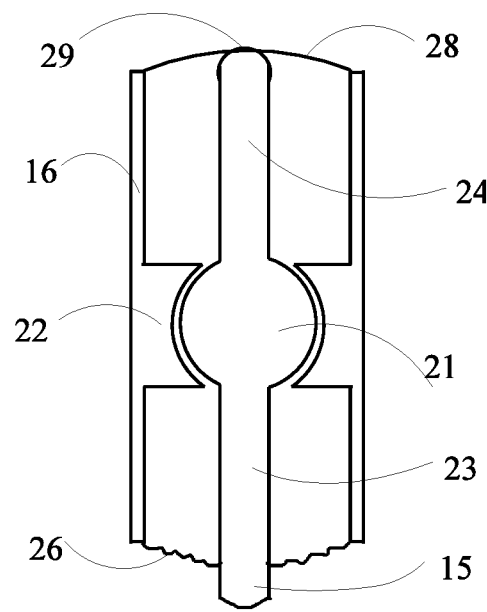
FIG. 4 is longitudinal cross-sectional view of a pressure tracking module at rest in accordance with one embodiment.
Figure 5:
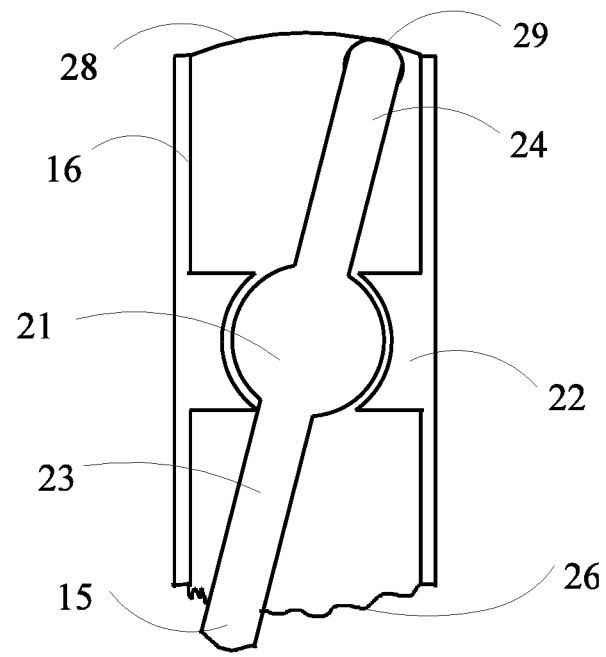
FIG. 5 is longitudinal cross-sectional view of the pressure tracking module in use in accordance with one embodiment.

The housing 16 contains the pointer control unit 12 that includes a pressure tracking module. The pressure tracking module detects and measures the pressure applied on the point tip 15, and converts the pressure to electronic signals that define cursor movement and location in an associated computer screen. The pressure tracking module includes a pressure response unit configured to convert pressure into movement; and a movement sensing unit comprising a motion sensor capable of measuring the movement from the pressure response unit in response to the pressure. FIG. 4 is longitudinal cross-sectional view of a pressure tracking module at rest, in accordance with one embodiment. FIG. 5 is longitudinal cross-sectional view of the pressure tracking module in use, in accordance with one embodiment. A ball 21 is rested in a partial spherical recess 22 or race. The ball 21 is restrained in the partial spherical recess 22, which is pivoted or secured to the housing 16. Other types of configurations are possible, in which a ball-and-socket joint is formed wherein the socket is pivoted onto the housing. The socket is essentially a frictionless socket, wherein the ball may rotate or spin in any directions in response to a force or pressure.

In one embodiment, a pressure is generated on the pointer tip 15 when a finger attached to input device is pressed against a surface that the pointer tip 15 rests upon. The pressure is conveyed to the ball 21 through a rod 23 that fixedly connects the ball 21 and the pointer tip 15. In a preferred embodiment, the rod 23 protrudes from the ball 21 and towards the underside of the ball 21, extends outside of the housing 16, and ends at the pointer tip 15. When no pressure is applied, the pointer tip 15 is maintained or aligned to a centered or rested position in the bottom of the housing 16, via an elastic ring 26 affixed to the housing 16. When the pointer tip 15 is pressed against a surface at an angle, a force or pressure is generated towards pointer tip 15 resulting in at least a partial turn or rotation of the ball 21. After the power tip 15 ceases contacting the surface, the force or pressure is removed, and the pointer tip 15 is restored to the centered or rested position through the mediation of the elastic ring 26.

The direction, magnitude, and length of the pressure determines the direction and extent of the movement of the ball 21, which can be measured by a movement sensing unit comprising a motion sensor capable of measuring the movement of the pressure response unit in response to the pressure. In one embodiment, a second rod 24 is fixedly connected to the ball 21 and extends into contact with a motion sensor 28 at a tip 29 of the second rod. The second rod 24 amplifies the rotation of the ball 21. The motion sensor 28 can detect and measure the rotation or turn of the ball 21 by tracking the position of the tip 29 of the second rod 24. As a result, the motion sensor 28 tracks the pressure applied to the power tip 15. The motion sensor 28 is connected to an electrical circuitry (not shown) that converts movement to electric signals and communicates the signals with an associated computer. The communication can be transmitted through wire or wireless means, as is known by those skilled in the art.

Figure 6:
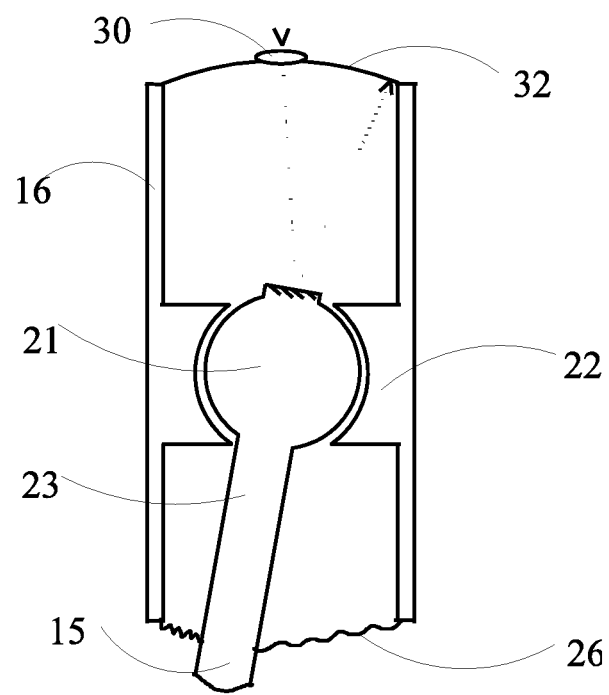
FIG. 6 is longitudinal cross-sectional view of a pressure tracking module in use in accordance with a further embodiment.

In a further embodiment, the movement of the movement sensing unit may be measured through a light sensor. FIG. 6 is longitudinal cross-sectional view of a pressure tracking module in use in accordance with a further embodiment. A light source 30 is provided within the housing 16. The light source 30 can also be located on the ball 21 or the second rod 24. A light emanating from the light source 30 is received by a photon detector 32. The photon detector 32 is typically located within the housing 16. The photon detector 32 can detect light emitted from the light source 30. An electronic circuitry converts photon detection into electrical signal representing the light source movement, and communicates the signal to a connected computer. In one embodiment, the light source is chosen from a light emitting diodes (LEDs). In another embodiment, the light source is chosen from laser.

Figure 7:
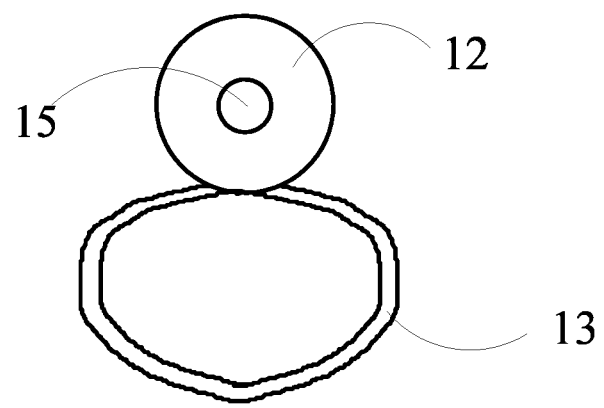
FIG. 7 is bottom view of a finger mounted computer input device in accordance with one embodiment.
Figure 8:
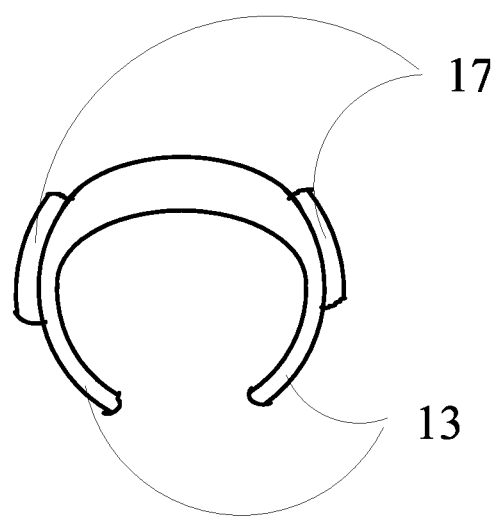
FIG. 8 is view of a finger mounted computer input device in accordance with one embodiment.

The finger attachment unit 13 attaches the pointer control unit 12 to a finger. FIGS. 7 and 8 are bottom and top view, respectively, of a finger mounted computer input device in accordance with one embodiment. In one embodiment, the attachment unit 13 is shaped as a ring into which a finger can slide into. In another embodiment, the attachment unit 13 may include a clamp or a clasp that is shaped like two extending arms and embraces a finger. In still another embodiment, the pointer control unit 12 and the attachment unit 13 can be constructed into an integral unit. In another embodiment, pointer control unit 12 and the attachment unit 13 can be constructed into separate units to be joined upon use. Different designs, schemes, and formats for joining and separating the pointer control unit 12 and the attachment unit 13 are possible, as will be appreciated by persons skilled in the art.

The housing 16 have a front that faces away from a finger, a backside in contact with the finger, and a left side and a right side. In one embodiment, the device may contain two momentary contact switches located on the left side and the right side of the housing, respectively. In a further embodiment, pushing one momentary contact switch sends a "Select" indication that provides the user with feedback that a particular position has been selected for further action; and pushing another momentary contact switch. Pressing, or pushing of a momentary contact switch can be achieved through a more ergonomic motion whereby the nearby fingers move towards each other laterally, instead of the downwards motion required in a traditional mouse that may cause undue stress on the pushing finger.

A method for constructing a finger-mounted computer input device is also disclosed. The method includes the steps of providing a housing adapted to be worn on a finger; providing a pressure tracking module significantly localized within or attached to the housing to detect pressure, wherein the pressure tracking module includes a pressure response unit configured to convert pressure into movement and a movement sensing unit comprising a motion sensor capable of measuring the movement of the pressure response unit in response to the pressure; providing a signal transmitter for communicating information about the detected pressure to a computer; providing at least one contact switch located on the house configured to communicate with the computer; and attaching an attachment unit to the housing. In one embodiment, the pressure response unit may include a ball-and-socket joint, a rod fixedly protruding from the ball and extending outside the housing, and an elastic ring affixed to the housing and in contact with the rod.

It is noted that the embodiment of the finer mounted computer input device described herein for exemplary purposes is subject to many different variations in structure, design, application and methodology. Because many varying and different embodiments may be made within the scope of the inventive concepts herein taught, and because many modifications may be made in the embodiment herein detailed in accordance with the descriptive requirements of the law, it is to be understood that the details herein are to be interpreted While the invention has been particularly shown and described as referenced to the embodiments thereof, those skilled in the art will understand that the foregoing and other changes in form and detail may be made therein without departing from the spirit and scope.

What is claimed is:

1. A computer input device, comprising:
a housing adapted to be worn on a finger;
a pressure tracking module significantly localized within the housing to detect pressure; further comprising:
a pressure response unit configured to convert pressure into movement and comprising:
a ball-and-socket joint wherein the socket wherein the ball is pivotable with the socket and the socket is positioned within the housing; and
a rod fixedly protruding from the ball and extending outside a distal end of the housing; and
an attachment unit configured to attach the housing to the finger.

2. A computer input device according to claim 1, wherein the pressure response unit further comprising:
a movement sensing unit comprising a motion sensor capable of measuring the movement of the pressure response unit in response to the pressure.

3. A computer input device according to claim 2, wherein the movement sensing unit further comprising:
a second rod fixedly connected to the ball, wherein an end of the second rod amplifying the rotation of the ball; and
a movement sensor in contact with the end of the second rod and configured to detect the movement of the end.

4. A computer input device according to claim 2, wherein the movement sensing unit further comprising:
a light source located on the ball;
a photon detector located within the housing and capable of detecting light from the light source;
an electronic circuit configured to convert photon detection into electrical signal representing the light source movement.

5. A computer input device according to claim 4, wherein the light source is chosen from one of light emitting diodes and laser.

6. A computer input device according to claim 2, wherein the joint is nearly frictionless.

7. A computer input device according to claim 1, wherein the pressure response unit further comprising:
a signal transmitter for communicating information about the detected pressure to a computer.

8. A computer input device according to claim 7, wherein the information communication to the computer can be performed wirelessly.

9. A computer input device according to claim 1, wherein the pressure response unit further comprising:
at least one switch located on the house configured to communicate with the computer.

10. A computer input device according to claim 9, further comprising:
the switch is a momentary contact switch.

11. A computer input device according to claim 1, wherein the pressure response unit further comprising:
an elastic ring affixed to the housing and in contact with the rod.

12. A computer input device according to claim 11, wherein the elastic ring is capable of return the second rod to a center position after the pressure is removed.

13. A computer input device according to claim 1, wherein the attachment unit further comprising at least one of a ring or a clamp.

14. A method for constructing a computer input device, comprising the steps of:
- providing a housing adapted to be worn on a finger;
- providing a pressure tracking module significantly localized within the housing to detect pressure, further comprising:
  - installing a pressure response unit configured to convert pressure into movement, comprising
    - a ball-and-socket joint wherein the socket wherein the ball is pivotable with the socket and the socket is positioned within the housing; and
    - a rod fixedly protruding from the ball and extending outside a distal end of the housing; and
- attaching an attachment unit to the housing.

* * * * *